United States Patent [19]

Beckett

[11] Patent Number: 5,711,343

[45] Date of Patent: Jan. 27, 1998

[54] DUAL PLATE CHECK VALVE

[75] Inventor: Kim Stuart Beckett, Stoke-on-Trent, United Kingdom

[73] Assignee: Goodwin International Limited, United Kingdom

[21] Appl. No.: 688,365

[22] Filed: Jul. 30, 1996

[51] Int. Cl.$^6$ ................................................ F16K 15/00
[52] U.S. Cl. ................ 137/512.1; 251/359; 29/890.127; 29/890.129; 219/76.14
[58] Field of Search .................. 137/512.1; 251/359; 29/890.126, 890.127, 890.129, 890.131; 219/76.14, 76.15

[56] References Cited

U.S. PATENT DOCUMENTS

| | | | |
|---|---|---|---|
| 496,136 | 4/1893 | Richards | 29/890.127 |
| 2,729,578 | 1/1956 | Hedlund et al. | 219/76.14 |
| 3,023,771 | 3/1962 | Hinds | 137/512.1 |
| 3,149,818 | 9/1964 | Siepmann | 29/890.129 |
| 3,807,429 | 4/1974 | Breton | 251/359 |
| 4,257,451 | 3/1981 | Paton | 137/512.1 |
| 4,377,892 | 3/1983 | Gonzalez | 251/359 |
| 4,395,050 | 7/1983 | Wirz | 277/236 |
| 4,509,722 | 4/1985 | Ebihara | 251/359 |
| 4,531,273 | 7/1985 | Smith et al. | 251/359 |
| 4,593,445 | 6/1986 | Snyder et al. | 29/157.1 |
| 5,060,374 | 10/1991 | Findlanl et al. | 29/890.129 |
| 5,083,750 | 1/1992 | Balik | 251/335.2 |
| 5,301,709 | 4/1994 | Gasaway | 137/512.1 |
| 5,392,810 | 2/1995 | Cooper et al. | 137/512.1 |
| 5,533,543 | 7/1996 | Semeia | 251/359 |

FOREIGN PATENT DOCUMENTS

| | | | |
|---|---|---|---|
| 2028467 | 3/1980 | Australia | 137/512.1 |
| 1187882 | 4/1968 | United Kingdom | 137/512.1 |

OTHER PUBLICATIONS

Search Report dated 28 Oct. 1996 (2 pages).

Primary Examiner—Denise L. Ferensic
Assistant Examiner—Joanne Y. Kim
Attorney, Agent, or Firm—Harness, Dickey & Pierce, P.L.C.

[57] ABSTRACT

A dual plate check valve comprises a substantially cylindrical valve body 10 provided with a diametrical cross-member 14 thereby defining a pair of substantially D-shaped apertures, and two substantially D-shaped plates 18, pivotally connected by a hinge means 20 parallel to said cross-member 14, and pivotable between a valve open position and a valve closed position in which the sealing face of each plate engages a sealing face provided on a valve seat 16 which surrounds each aperture. A groove is provided in each sealing face which is then filled with a weld inlay 40, 42 and then machined to provide a sealing face portion of a more durable metal alloy.

24 Claims, 7 Drawing Sheets

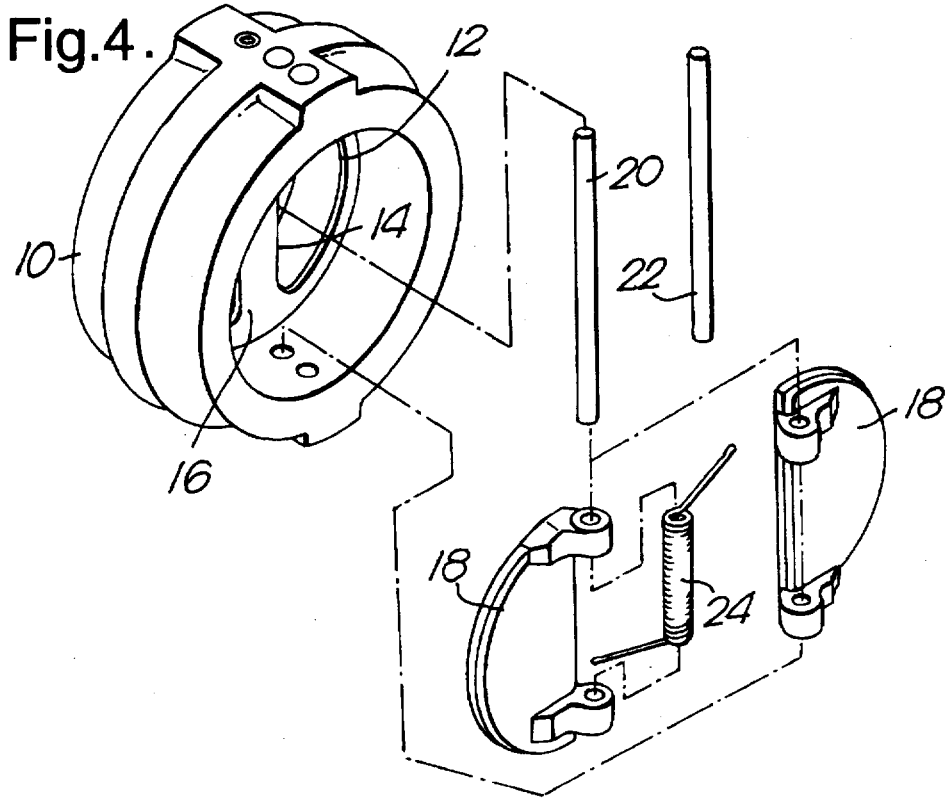
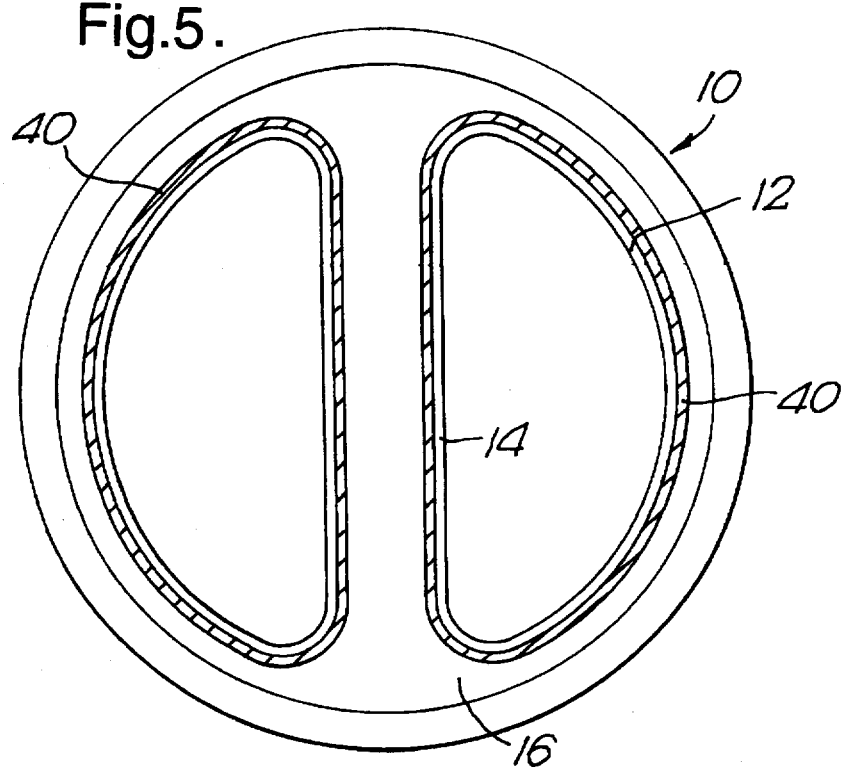

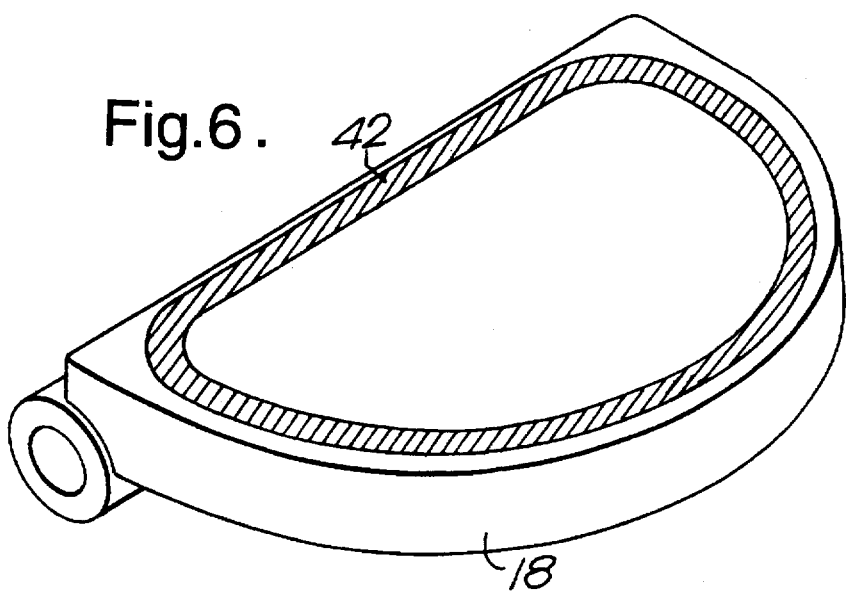
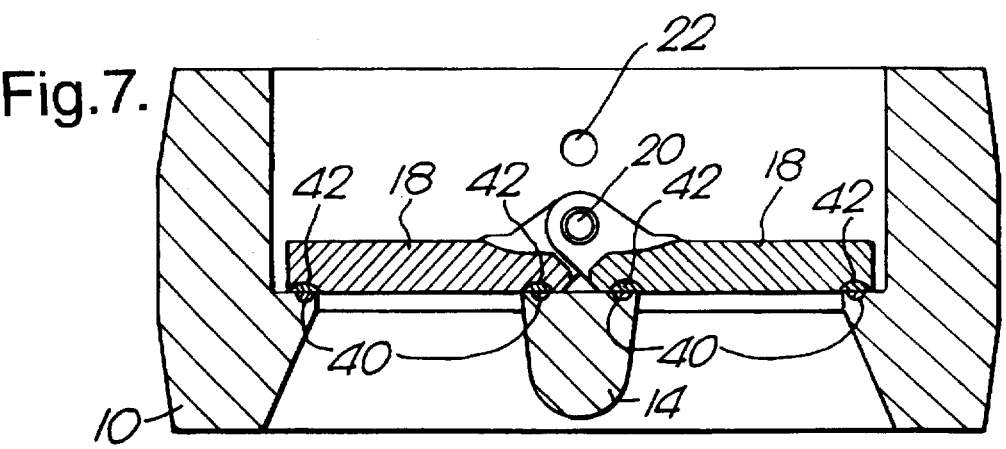
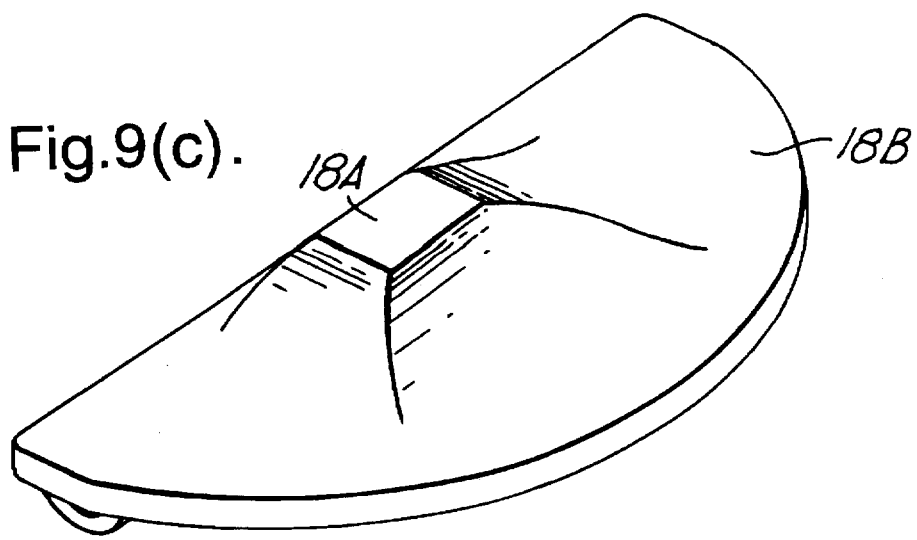

DUAL PLATE CHECK VALVE

This invention relates to dual plate check valves and to a manufacturing method.

Dual plate check valves are known which comprise an annular housing or valve body with two substantially semi-circular, or D-shaped valve members or plates pivotally mounted on a diametral hinge pin. The plates can be urged by reverse pressure towards a valve closed position in which they shut respective semi-circular or D-shaped apertures defined in the valve body by a diametral cross piece, thereby providing the function of a non-return valve. The plates can be urged by pressure of a given level on the upstream side of the valve towards an open position in which they are generally parallel to the valve body axis.

For certain applications it is known to provide the valve seat surrounding the apertures with a resilient material to act as a sealing member and improve the seal between the valve seat and the sealing surface of the valve plate. However, for other applications such as at high or low temperatures or for handling corrosive fluids, no suitable seal materials are available. In these cases, it is necessary to provide a metal to metal seal between the valve seat and the valve plate. However, the sealing surfaces of the valve seat and the valve plate which move into and out of contact with each other are subject to wear or degradation due to corrosion or erosion so it is also known to provide the surfaces with an overlay of a material more durable than the metal of the valve body or the valve plate or with a corrosion resistant material. This overlay has been formed by welding an alloy surface to the respective sealing surfaces.

FIG. 1(a) shows in cross-section a portion of a prior art check valve in the closed position with the raised weld overlay 2 provided on the valve seat 4 sealingly engaging the weld overlay 6 provided on the plate 8. When the plate 8 is subjected to high reverse pressure it suffers distortion, such as bowing of the plate, since it is only supported around its edges. This creates extreme local pressure on the edge of the weld bead with the seal tending towards a line seal. The greater the back pressure on the valve plate, the higher the stress on point "A" of the weld shown in FIG. 1(b). These stresses are known as Hertzian stresses and cause degradation of the sealing surfaces. As a result of the necessary play within the hinge 9 to allow the heel of the plate to lift clear of the body prior to opening, such play also permitting sideways movement of the plate, the plate will sometimes reseat in the closed position on the sealing surfaces deformed by Hertzian stress, thus,leading to leakage across the valve seal.

Deformation of the sealing surfaces is made even worse by the weld bead 2 on the valve seat 4 having a rippled edge as shown in FIG. 2 resulting from the manufacturing method described below. As shown in FIG. 1(b) when reverse pressure is increased and the plate deforms, the seal between the sealing surfaces tends to become a line seal on the inner edge of the weld bead 2, which being irregular leads to leakage. Due to creation of local leakage paths the weld ripple also contributes to wire drawing on the seal contact faces.

A further problem with the above type of weld overlay results from the fact that at high or low temperatures, there can be differential thermal expansion/contraction between the weld metal and the underlying metal. In effect these metals form a bi-metallic strip and the differential expansion/contraction leads to distortion in the carefully machined, flat finish contributing to greater leakage. This can be a problem especially on the plate because of the larger quantity of weld overlay metal used to achieve the necessary depth right across the sealing face, A conventional method for providing a weld overlay for dual plate check valves is as follows.

The valve seat is machined down to provide clearance for the thickness of the weld overlay which is to be applied. The valve seat surface is marked with punch marks or similar to identify the intended weld overlay area. The weld overlay is applied by forming three welds on the valve seat around the aperture to form a raised bead. Two lines of weld are run alongside each other and the third is located between and overlapping on top of the first two to give a bead of the necessary raised height. This bead is then machined down to form a sealing surface approximately 2 mm high above the seat surface and to remove any irregularities in height of the bead.

Further, the surface of each valve blare is machined back and an overlay of metal alloy welded across a large area of the plate to ensure that the overlay will contact the sealing surface of the valve seat the whole way around the aperture. This requires many weld runs. The overlay on the valve plate is then finish machined to give the required plate thickness.

It is necessary to pre-heat both the valve body and valve plates prior to welding, and post-weld heat treatment is also required. The plates require pressing to flatten them out as they suffer distortion during the repeated welding.

This prior method also suffers from the following limitations, described with reference to FIGS. 2 and 3. The weld overlay 2 is built up by hand on the surface of the valve seat 4 and the plate 8, therefore the edge of the weld is irregular or rippled as shown in FIGS. 2 and 3. FIG. 3 also shows the large area of weld overlay 2 required on the valve plate 8. The welding process also creates spatter and burn-off adjacent to the weld thus degrading the surface of for example the valve seat. If the height of the weld is insufficient at any point following machining, the weld must be built up with a fresh weld and then re-machined.

It is an aim of this invention to reduce these disadvantages and problems.

According to the present invention there is provided a dual plate check valve comprising:

a substantially cylindrical valve body provided with a diametrical cross-member thereby defining a pair of substantially D-shaped apertures; and two substantially D-shaped plates, pivotally connected by a hinge means parallel to said cross-member, and pivotable between a valve open position and a valve closed position in which a sealing face portion of each plate engages a sealing face portion provided on a valve seat which surrounds each aperture, wherein the sealing face portions on each of the plates and/or on each of the valve seats has a groove into which an inlay has been welded.

According to another aspect of the present invention there is provided a method of forming a valve sealing face portion of a sealing surface of the plates and/or valve seats of a dual plate check valve having a substantially cylindrical valve body provided with a diametrical cross-member thereby defining a pair of substantially D-shaped apertures, and two substantially D-shaped plates, pivotally connected by a hinge means parallel to said cross-member, and pivotable between a valve open position and a valve closed position in which the sealing face portion of each plate engages a sealing face portion provided on a valve seat which surrounds each aperture, the method including the steps of:

(a) providing a groove in the or each sealing surface;

(b) welding an inlay in said groove.

With this invention, the weld inlay can be applied in a single run or reduced number of runs simply by filling the groove without the need to repeatedly build up the weld material. This may reduce the requirement for pre- and post-weld heat treatment, and alleviate the need for pressing of a valve plate.

This invention is particularly advantageous for dual plate check valves in which the plates have raised reinforced central portions and non-reinforced portions adjacent to each end of the straight edge of the plate as this design is superior for maintaining a flat face to face seal between the weld inlay sealing portions.

A valve according to this invention can advantageously be used in high or low temperature fluid line assemblies with minimal or no leakage when the valve is closed. The weld inlay according to this invention can be much narrower than the prior weld overlay, therefore there is a considerably smaller metal surface area to suffer the distortion effects of differential thermal expansion/contraction. In the invention, the weld metal depth can be minimised without the risk of dilution and is able to taper off at the edges without the risk of cracking. Furthermore, by providing the weld inlay in a groove a shape is created which is less liable to distort under the differential expansion/contraction i.e. the valve body or plate metal has a larger surface area in contact with the weld relative to the width of the weld, and surrounds the weld such that the stresses caused by differential expansion/contraction can be withstood without the same extent of deformation of the sealing surface.

A specific embodiment of the invention will now be described byway of example only with reference to the accompanying drawings in which:

FIGS. 1(a) and (b) illustrate in cross-section a prior dual plate check valve seal;

FIG. 4 shows an exploded view of a dual plate check valve of the type in which the present invention can be used;

FIG. 5 is a plan view of an embodiment of the body of a valve according to the invention;

FIG. 6 illustrates an embodiment of a valve plate for a valve according to the invention;

FIG. 7 illustrates in cross-section an embodiment of a dual plate check valve according to the invention;

Figure 1A:
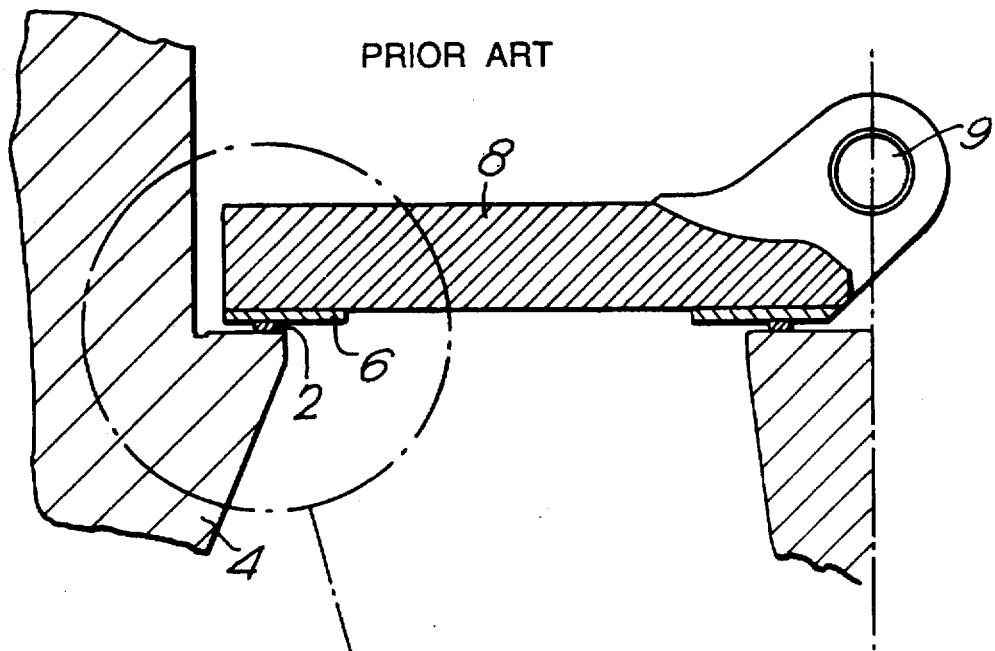
Figure 1B:
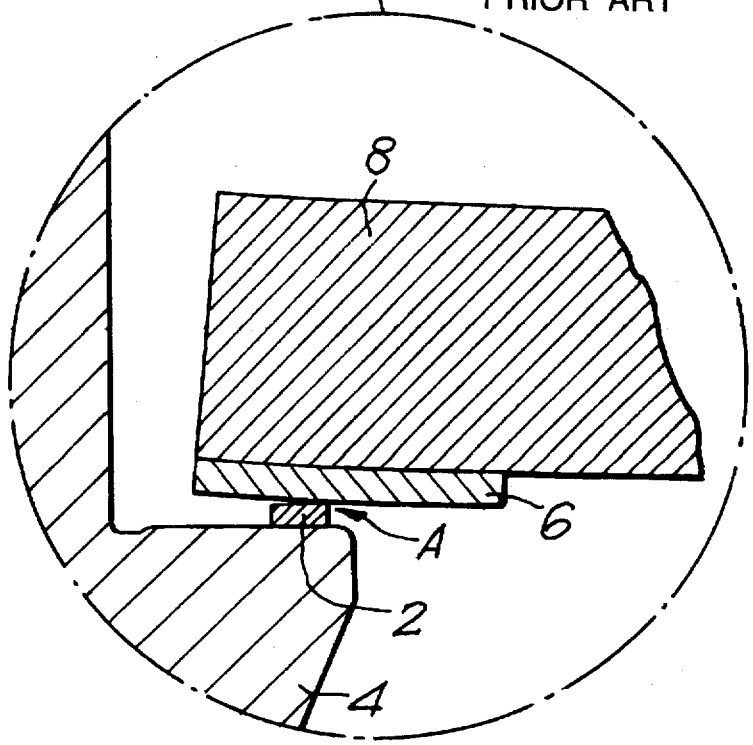
Figure 2:
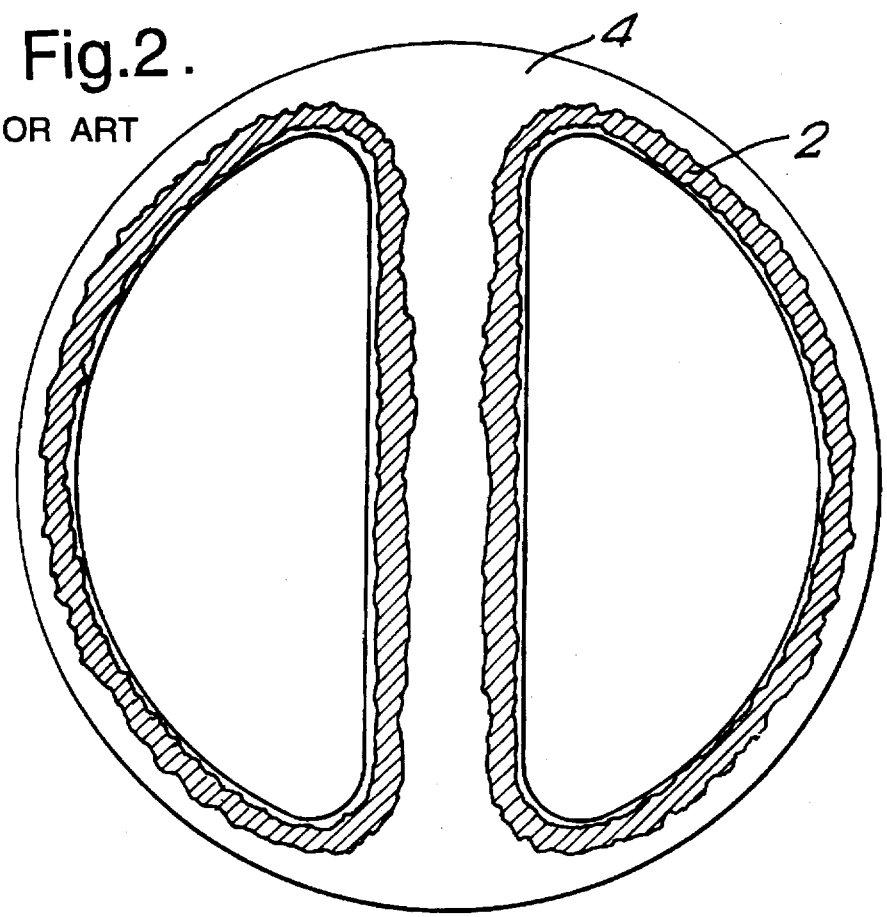
FIG. 2 shows a weld overlay provided on a valve seat according to a prior method.
Figure 3:
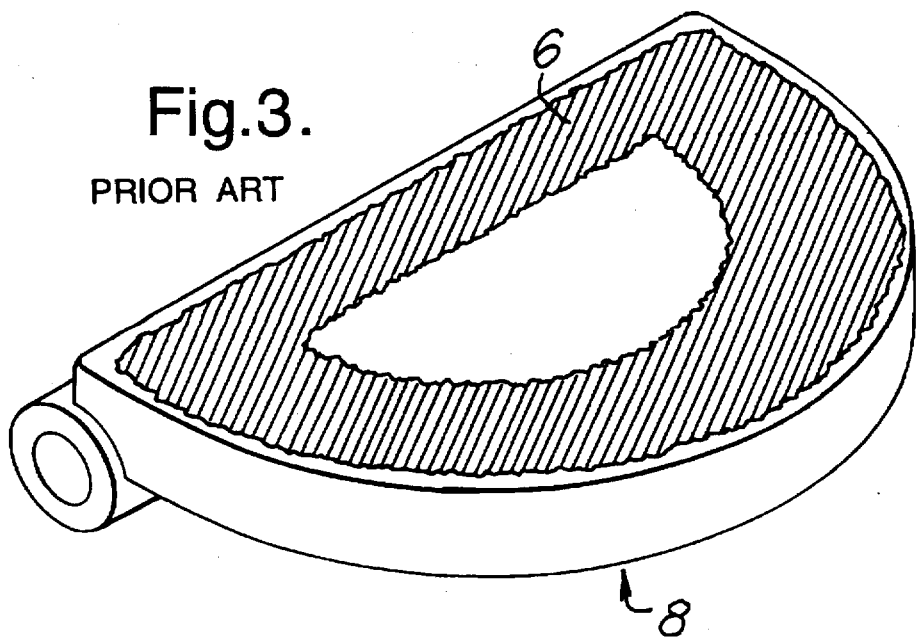
FIG. 3 shows a weld overlay provided on a valve plate according to a prior method.
Figure 8A:
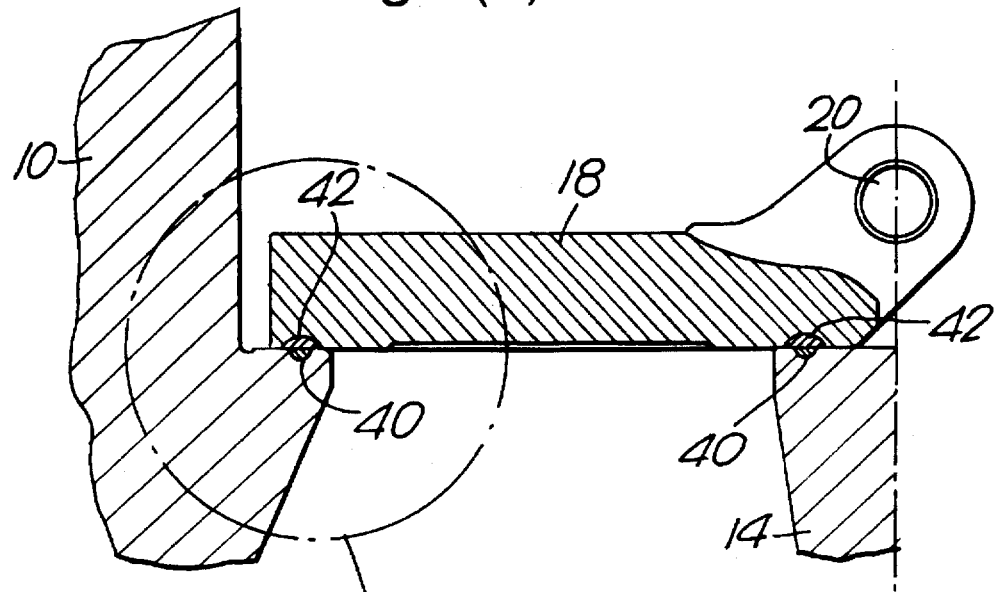
Figure 9A:
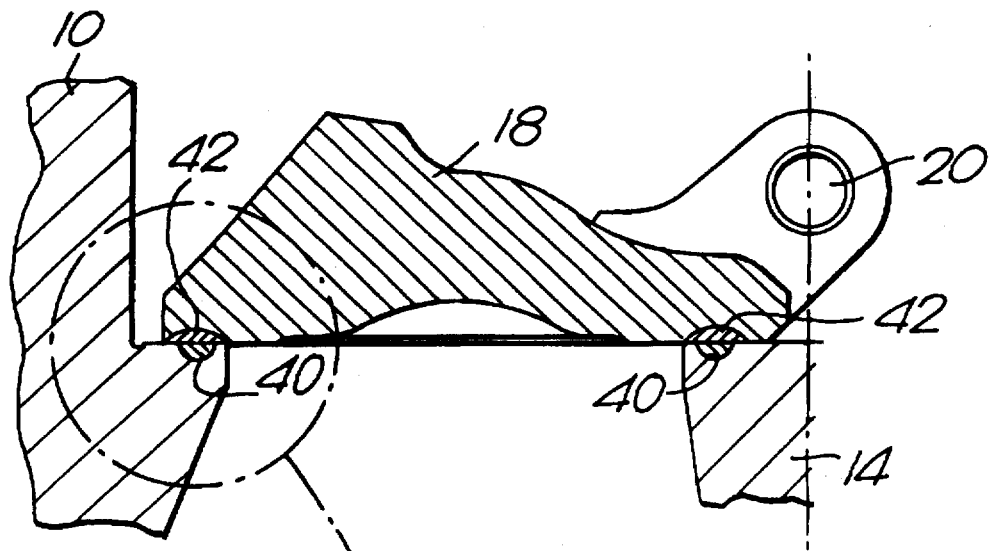
Figure 10A:
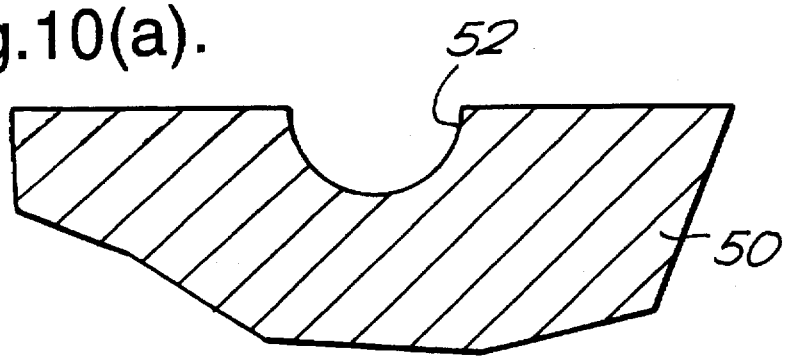

FIGS. 8(a) and (b) illustrate in cross-section an embodiment of a dual plate check valve according to the invention;

FIGS. 9(a), (b) and (c) illustrate in cross-section and plan view a further embodiment of a dual plate check valve according to the invention; and FIGS. 10(a), (b) (c) and (d) show in section a first and a second embodiment of the stages of fabricating a weld inlay on a valve component according to the present invention.

FIG. 4 shows a dual plate check valve in which the invention can be used. The invention may be embodied in other types of dual plate check valve with metal to metal sealing surfaces.

Referring to FIG. 4, the valve has an approximately cylindrical body 10 which has an axial bore through it for the passage of fluid. An annular portion 12 projects into the aperture from the inner wall of the valve body 10. A cross-member 14 extends diametrically across the valve body 10 and together with the annular projection 12 defines two D-shaped apertures. The annular projection 12 and the diametrical cross-member 14 comprise the valve seat 16 on which valve plates 18 rest when the valve is in a closed state.

A D-shaped or generally semi-circular valve plate 18 is provided for each D-shaped aperture in the valve body 10.

Fluid may flow through the valve from an upstream side of the valve seat to a downstream side thereof. As shown in FIG. 4, the two valve plates are located on the downstream side of the valve seat 16. The two plates 18 have lugs by which they are pivotally connected to a hinge pin 20 extending diametrally across the valve body 10 parallel to the cross-member 14. in the valve closed position, the two generally semi-circular or D-shaped plates 18 are pivoted around hinge pin 20 into sealing contact with the valve seat 16. A stop pin 22 extends diametrally across the valve body 10 parallel to and downstream of the hinge pin 20 to limit the degree of opening of the valve plates 18. Optionally a spring or springs 24 bias the dual valve plates 18 into sealing contact with the valve seat 16.

The hinge pin 20, stop pin 22 and plates 18 maybe supported in the valve body 10 by means of a conventional retainer system (not shown), or by means of inserts as described in WO 95/27163.

FIGS. 5 and 6 show a weld inlay 40 provided on the valve seat 16 of the valve body 10 and a weld inlay 42 provided on the sealing surface of a valve plate 18.

FIG. 7 shows a valve of the invention with such inlays in axial cross section in a plane perpendicular to the cross-member 14 and hinge pin 20.

The weld inlays 40, 42 are each contained in a groove which in cross section has a arcoats or generally semi-circular profile which has been filled with the weld inlay material. The grooves may of course have different profiles such as rectangular, U-shaped, V-shaped or dovetail (i.e. with the width increasing with depth). The dimensions and shape of the groove may vary along the length of the groove. It may for example be advantageous to have a wider inlay portion at the centre of the curved portion of the D-shaped plate which is subjected to the greatest effect of back pressure acting on the plate in the valve closed position. As seen in FIGS. 5 and 6 the edges of the inlays in the grooves do not suffer from weld ripple. The groove and inlay on the plate 18 are wider than those on the valve seat to allow for play within the hinge of the plate which will affect the precise position at which the plate seats in the valve closed position, but ensures that the inlays 40, 42 Still contact each other form a seal. Alternatively, the inlay on the valve seat could be wider than the inlay on the plate. Both the inlay 42 and inlay 40 can be much more accurately located by the method of the present invention, less allowance needs to be made than in the prior art valves where application of weld beads by hand provided a further degree of uncertainty of location.

Figure 8B:
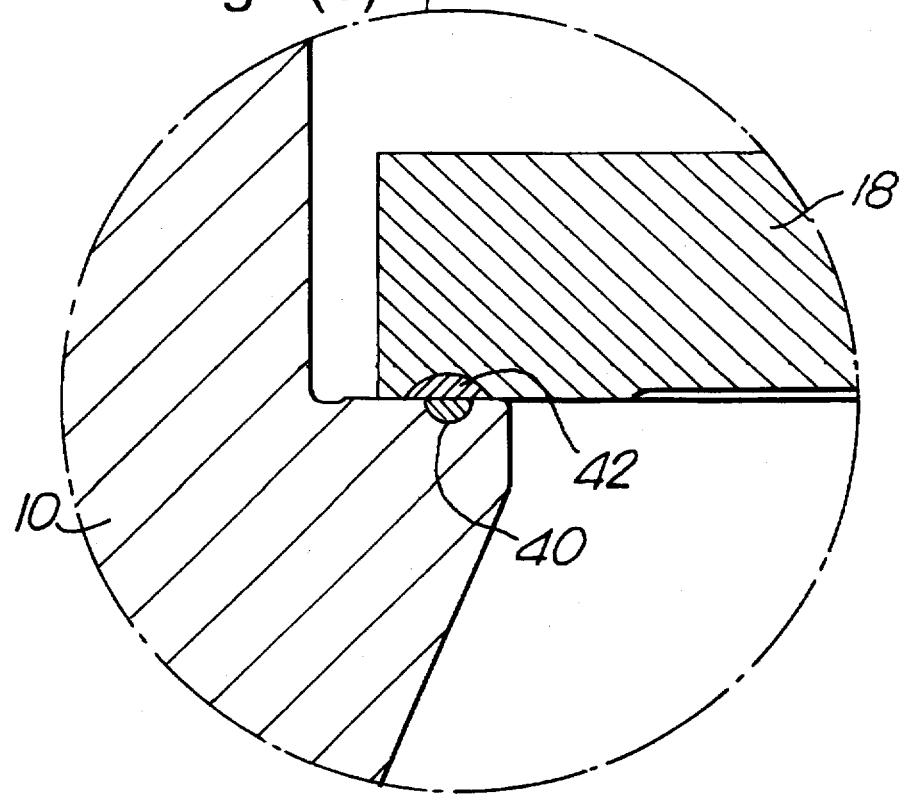

FIG. 8(a) is a similar cross section to that of FIG. 7 but showing only half a valve and one valve plate 18. The valve plate 18 in the embodiment shown in FIGS. 7 and 8 is a generally flat plate. FIG. 8(b) shows in detail the seal formed between the valve plate 18 and the valve seat and in particular the weld inlays 42 and 40 respectively corresponding to those shown in FIGS. 7 and 8(a).

Figure 9B:
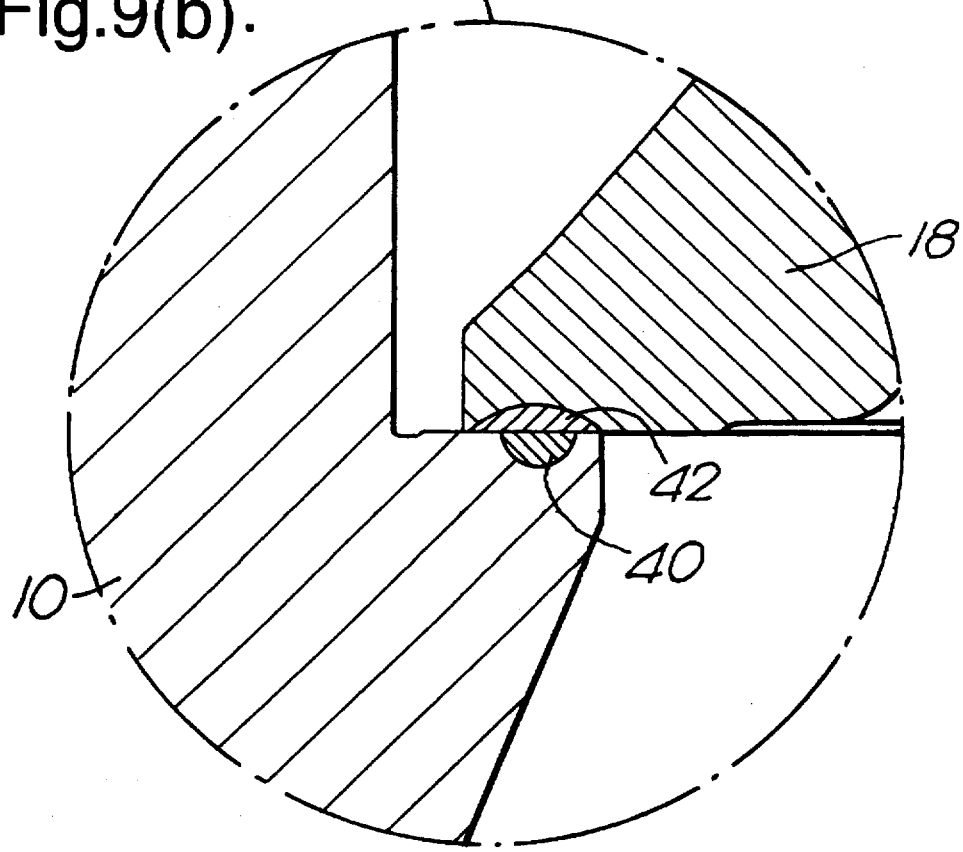

FIGS. 9(a) and (b) show a different preferred embodiment of the invention in views corresponding to FIGS. 9(a) and (b) with a further plan view 9(c) of the plate 18. The plate 18 in the embodiment shown in FIG. 9 have raised reinforced central portions on the downstream side and recesses on the upstream side, in accordance with the teaching of WO 95/15455, the contents of which are hereby imported by reference.

As disclosed in WO 95/15455 the use of a reinforced central portion 18A and non-reinforced portions 18B adjacent to each end of the straight edge of the plate 18 provides superior face to face sealing characteristics.

FIG. 10 illustrates stages in a method according to the invention of making a weld inlay of a valve seal.

FIG. 10(a) shows in section a portion of a valve component 50 which could be, for example, a valve seat or a valve plate, and in which a groove 52 has been formed. The groove 52 may be formed by milling or machining or may be formed when the valve component is cast or forged or by any other suitable process. In this embodiment the groove 52 has a generally semi-circular cross section and the depth of the groove is approximately 2 mm.

Figure 10B:
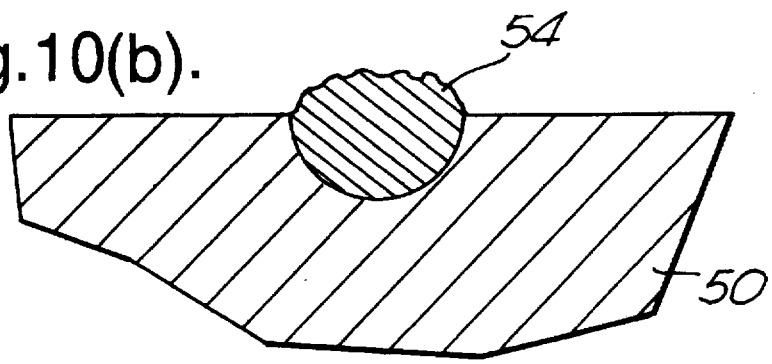

FIG. 10(b) shows the groove after it has been filled with a weld inlay material 54 by a welding process. In this embodiment of the method, the groove is slightly over- filled and the material 54 protrudes above the surface of the valve component and surface tension forms a meniscus on the upper surface of the material. However, surface tension pulls the weld precisely to the edge of the groove. Forming the weld in the groove significantly reduces spatter and burn-off as the welding arc is located in the groove, and a better arc can be maintained.

Figure 10C:
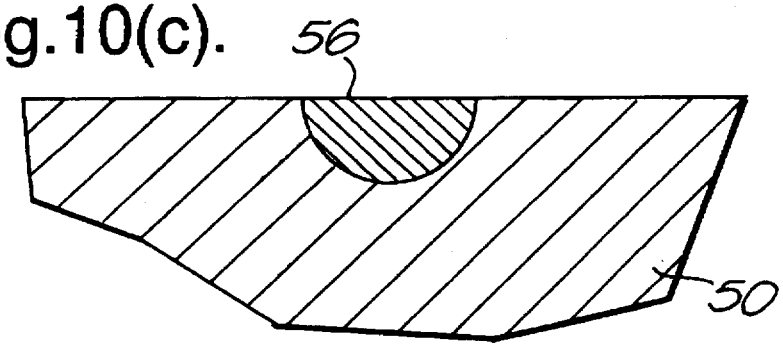

The weld inlay is now finish machined to provide a flat sealing surface 56 generally level with the surface of the component 50, as illustrated in FIG. 10(c). This provides a very accurate machine line edge to the weld inlay seal, as shown for example in FIG. 4, with no edge ripple as the weld was formed in a precise groove.

Figure 10D:
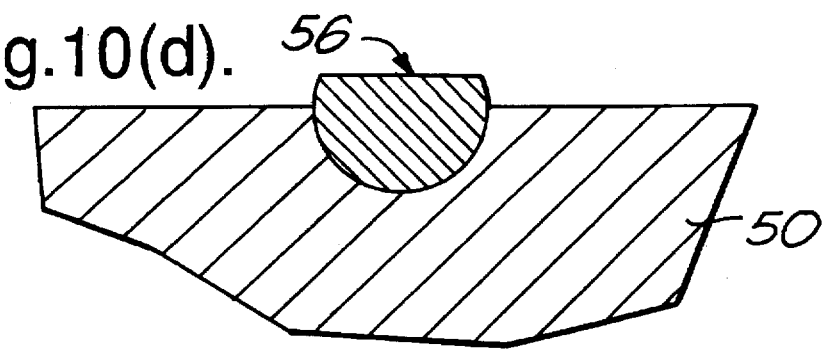

Alternatively as shown in FIG. 10(d) the weld inlay could be finish machined to be slightly proud of the surrounding surface or the adjacent metal on either or both sides could be machined away to leave the weld either slightly or very proud. The metal surrounding the weld can contribute to the seal, and by spreading the load, the Hertzian stress on the weld is relieved. Even if the weld is slightly proud, or is only flush on one side, the problem of Hertzian stress can still be alleviated.

Dual plate check valves are made in a wide range of sizes, consequently groove depths or weld inlay thicknesses may be as small as 0.01 mm or as large as 20 mm or more. A typical depth is 0.5 mm to 5 mm, particularly 1 mm to 3 mm. Normally the inlay will be at least as wide as it is deep, and it can with advantage be wider. Thus it maybe as narrow as 0.01 mm and as wide as 20 mm or even more if it is wider than its depth. A typical width for a 2 inch (50 mm) valve might be 1 to 2 mm and for a 36 inch (900 mm) valve might be 5 to 15 mm, most typically about 10 mm. As described above, the inlay on the plate is advantageously wider than that on the valve seat (or vice versa) but not necessarily deeper. In this case the width might be say 1 mm to 20 mm typically.

Many different materials may be used for the weld inlay depending upon the application for which the valve is designed. The following are some examples:

Stellite (trademark), a cobalt, chromium, tungsten, molybdenum alloy which is hard wearing and desirable for use with abrasive fluids;

316 stainless steel for use with corrosive fluids, 410 stainless steel for use in applications subject to temperature erosion;

Monel (trademark), an alloy principally of nickel and copper, for use with acids; and Inconel 625 (trademark), an alloy principally of nickel, chromium and iron that is resistant to corrosive fluids.

The illustrated embodiments show a weld inlay 40, 42 provided on both the valve seat and the valve plate. However, in certain circumstances, a valve inlay may be provided in one or the other valve component. Where inlays are provided on both seat and plate, they do not have to be both of the same weld inlay material. The inlay may be built up in layers of more than one material for example an Inconel layer and an outer Stallits layer, such as by filling a groove with a first inlay material and then forming a shallower groove in the first inlay material for filling with the second inlay material.

The use of a valve with weld inlays according to the present invention provides accurate metal to metal seals. Substantially zero or extremely low reverse leakage rates are obtainable even at elevated pressures making such valves suitable for use in high pressure fluid lines requiring valves of 300 class ANSI pressure rating (PN 50) or higher. Valves according to the present invention may be used in cryogenic (down −196° C. and below) and high temperature (up to 350° C. and above) fluid line assemblies, in particular in applications where zero or extremely low leakage rates are required. This is because the present invention alleviates the problem of distortion of the sealing faces caused by different thermal expansion/contraction of the weld metal relative to the surrounding metal.

I claim:

1. A dual plate check valve comprising:
   a substantially cylindrical valve body provided with a diametrical cross-member thereby defining a pair of substantially D-shaped apertures; and
   two substantially D-shaped plates, pivotally connected by a hinge means parallel to said cross-member, and pivotable between a valve open position and a valve closed position in which a sealing face portion of each plate engages a sealing face portion provided on a valve seat which surrounds each aperture,
   where in each sealing face portion has a groove filled with weld inlay.

2. The valve as claimed in claim 1, wherein said weld inlay is 1 mm to 15 mm wide.

3. The valve as claimed in claim 1, wherein said weld inlay is 0.5 mm to 5 mm thick.

4. The valve as claimed in claim 1, wherein said grooves are substantially one of semi-circular, rectangular, U-shaped, V-shaped and dovetail in transverse cross-section.

5. The valve as claimed in claim 1, wherein each weld inlay comprises one of Stellite, stainless steel, Monel or Inconel.

6. The valve as claimed in claim 1, provided with weld inlays on both of the valve plates and valve seats, the inlays on the plates being located so as to contact corresponding inlays on the valve seats when the valve is in the closed position.

7. The valve as claimed in claim 1, wherein the inlays on the plates are wider than those on the seats.

8. The valve as claimed in claim 1, wherein each or at least one weld inlay is finished flush with the respective adjacent plate face.

9. The valve as claimed in claim 1, wherein each weld inlay is finished proud on at least, one side.

10. The valve as claimed in claim 1, including plates comprising a reinforced central portion and non-reinforced portions adjacent to each end of the straight line of the D.

11. A high pressure fluid line assembly including at least one valve as claimed in claim 1.

12. A cryogenic fluid line assembly including at least one valve as claimed in claim 1.

13. A high temperature fluid line assembly including at least one valve as claimed in claim 1.

14. A method of forming a valve sealing face portion of a dual plate check valve having a substantially cylindrical valve body provided with a diametrical cross-member thereby defining a pair of substantially D-shaped apertures, and two substantially D-shaped plates, pivotally connected by a hinge means parallel to said cross-member, and pivotable between a valve open position and a valve closed position in which the sealing face portion of each plate engages a sealing face portion provided on a valve seat which surrounds each aperture, the method including the steps of:

(a) providing a groove in each sealing surface;

(b) forming a weld inlay in said groove.

15. The method as claimed in claim 14, wherein step (b) further comprises forming said inlay by welding so that the weld inlay protrudes above the top of the groove.

16. The method as claimed in claim 14, further comprising the step of finishing each weld inlay flush with its respective sealing surface.

17. The method as claimed in claim 14, further comprising the step of finishing the or each weld inlay proud on one or both sides.

18. The method as claimed in claim 14, wherein said groove is 1 mm to 15 mm wide.

19. The method as claimed in claim 14, wherein said groove is 0.5 mm to 5 mm deep.

20. The method as claimed in claim 14, wherein said groove is substantially one of semicircular, rectangular, U-shaped, V-shaped and dovetail in transverse cross-section.

21. The method as claimed in claim 14, wherein said groove is integrally cast said sealing surface.

22. The method as claimed in claim 14, wherein said weld inlay comprises Stellite, stainless steel, Monel or Inconel.

23. The valve as claimed in 1, wherein said weld inlay is 0.01 mm to 20 mm thick.

24. The method as claimed 14, wherein said groove is integrally forged said sealing surface.

* * * * *

UNITED STATES PATENT AND TRADEMARK OFFICE
CERTIFICATE OF CORRECTION

PATENT NO. : 5,711,343

DATED : January 27, 1998   Page 1 of 2

INVENTOR(S) : Kim Stuart Beckett

It is certified that error appears in the above-identified patent and that said Letters Patent is hereby corrected as shown below:

Column 1, line 48, delete "," (second occurence in patent).

Column 2, line 16, "blare" should be --plate--.

Column 3, line 31, "byway" should be --by way--.

Column 4, line 9, "in" should be --In--.

Column 4, line 17, "maybe" should be --may be--.

Column 4, line 28, "arcoats" should be --arcuate--.

Column 4, line 43, "Still" should be --still--.

Column 4, line 44, after "other" insert --to--.

Column 4, line 48, after "of" insert --the--.

Column 4, line 60, "plate" should be --plates--.

Column 5, line 43, "maybe" should be --may be--.

Column 6, line 6, "Stallits" should be --Stellite--.

UNITED STATES PATENT AND TRADEMARK OFFICE
CERTIFICATE OF CORRECTION

PATENT NO. : 5,711,343
DATED : January 27, 1998
INVENTOR(S) : Kim Stuart Beckett Page 2 of 2

It is certified that error appears in the above-indentified patent and that said Letters Patent is hereby corrected as shown below:

Column 6, line 17, after "down" insert --to--.

Column 6, line 35, Claim 1, "each" should be --at least one--.

Column 7, line 12, Claim 14, "each" should be --at least one--.

Column 8, line 2, Claim 17, delete "the or"

Column 8, line 11, Claim 21, after "cast" insert --with--.

Column 8, line 16, Claim 24, after "claimed" insert --in claim--.

Column 8, line 17, Claim 24, after "forged" insert --with--.

Signed and Sealed this

Seventh Day of July, 1998

Attest:

*Attesting Officer*

BRUCE LEHMAN
*Commissioner of Patents and Trademarks*